(12) United States Patent
Boemi et al.

(10) Patent No.: US 9,805,405 B2
(45) Date of Patent: Oct. 31, 2017

(54) MOBILE DEVICE PAYMENT SYSTEM AND METHOD

(71) Applicants: Andrew A. Boemi, Barrington, IL (US); John L. Snyder, Westminster, MD (US); Peter C. Vogelberger, Hoover, AL (US)

(72) Inventors: Andrew A. Boemi, Barrington, IL (US); John L. Snyder, Westminster, MD (US); Peter C. Vogelberger, Hoover, AL (US)

( * ) Notice: Subject to any disclaimer, the term of this patent is extended or adjusted under 35 U.S.C. 154(b) by 369 days.

(21) Appl. No.: 14/623,975

(22) Filed: Feb. 17, 2015

(65) Prior Publication Data

US 2015/0235290 A1 Aug. 20, 2015

Related U.S. Application Data

(60) Provisional application No. 61/940,248, filed on Feb. 14, 2014.

(51) Int. Cl.
| | |
|---|---|
| *G06Q 30/00* | (2012.01) |
| *G06Q 30/06* | (2012.01) |
| *G06Q 20/10* | (2012.01) |
| *G06Q 20/24* | (2012.01) |
| *G06Q 20/32* | (2012.01) |

(Continued)

(52) U.S. Cl.
CPC ....... *G06Q 30/0617* (2013.01); *G06Q 10/083* (2013.01); *G06Q 20/10* (2013.01); *G06Q 20/12* (2013.01); *G06Q 20/20* (2013.01); *G06Q 20/24* (2013.01); *G06Q 20/322* (2013.01)

(58) Field of Classification Search
None
See application file for complete search history.

(56) References Cited

U.S. PATENT DOCUMENTS

| | | | | |
|---|---|---|---|---|
| 9,372,971 B2* | 6/2016 | Hammad | ............... | G06Q 20/12 |
| 9,424,413 B2* | 8/2016 | Hammad | ............... | G06F 21/34 |

(Continued)

OTHER PUBLICATIONS

NFC mobile credit card: The next frontier of mobile payment? (Garry Wei-Han Tan, Keng-Boon Ooi, Siong-Choy Chong, and Teck-Soon Hew; Telematics and Infomatics; journal homepage: www.elsevier.com/locate/tele; available Jun. 20, 2013).*

*Primary Examiner* — Courtney Stopp
(74) *Attorney, Agent, or Firm* — Cardinal Law Group

(57) ABSTRACT

A mobile device payment system and method, the method for a mobile device user to purchase goods/services from merchants with financing by a mobile device manufacturer including: providing a mobile device; establishing a user account; establishing merchant accounts; transforming the merchant accounts into a universal merchant account data set; providing the universal merchant account data set to the mobile device user; storing the universal merchant account data set; requesting the mobile device manufacturer to load consumer credit; loading the credit amount; identifying goods/services for purchase; determining a total price for the identified goods/services and a merchant identifier associated with the selected merchant; actuating a purchase button; retrieving merchant bank deposit instructions; retrieving purchase credit; and routing the retrieved credit to the selected merchant in accordance with the retrieved merchant credit deposit instructions.

20 Claims, 6 Drawing Sheets

(51) Int. Cl.
*G06Q 10/08* (2012.01)
*G06Q 20/12* (2012.01)
*G06Q 20/20* (2012.01)

(56) References Cited

U.S. PATENT DOCUMENTS

| | | |
|---|---|---|
| 9,589,268 B2* | 3/2017 | Hammad |
| 2010/0010906 A1* | 1/2010 | Grecia ................. G06Q 20/102 705/21 |
| 2010/0121701 A1 | 5/2010 | Nguyen et al. |
| 2012/0330744 A1* | 12/2012 | Aissa ................. G06Q 30/0238 705/14.38 |
| 2013/0073432 A1 | 3/2013 | Mulholland |
| 2013/0138563 A1* | 5/2013 | Gilder ................. G06Q 20/4016 705/44 |
| 2013/0282581 A1 | 10/2013 | Singh |
| 2013/0282588 A1 | 10/2013 | Hruska |
| 2013/0329889 A1 | 12/2013 | Griffith |

* cited by examiner

MOBILE DEVICE PAYMENT SYSTEM AND METHOD

CROSS-REFERENCE TO RELATED APPLICATIONS

This application claims the benefit of U.S. Provisional Patent Application Ser. No. 61/940,248, filed Feb. 14, 2014, incorporated by reference in its entirety herein.

TECHNICAL FIELD

The technical field of this disclosure is payment systems and methods for electronic commerce, particularly, mobile device payment systems and methods.

BACKGROUND OF THE INVENTION

Using a mobile device to purchase goods and services online is becoming increasingly common. Traditionally, merchants create websites to display and document their goods and services. Consumers visit these websites to find something specific, simply browse to see what is available, or discover something through serendipity. With the proliferation of mobile devices having smaller screens and primitive controls, merchants are now offering applications ("apps") designed to operate independently on these devices, outside web browsers, with simpler navigation controls and data entry tools. Because the business rules, processing, and data reside on remote servers, the apps must still be wirelessly connected to servers in order to function.

Regardless of the platform, presently available online payment systems require the merchant to provide a mechanism to complete a purchase and receive the associated funds. This is often the most cumbersome part of the process, particularly if the consumer is a first-time customer of the particular merchant. There are a wide variety of payment systems and platforms, e.g., PayPal, available for mobile devices to make payments, but virtually all are tied directly to processing by third party credit card or debit card companies (e.g., Visa, CitiBank, etc.) in conjunction with these purchases.

Unfortunately, the third party credit card or debit card companies extract a fee for processing the payment, averaging 2% or more of the payment amount. The payment processing fee is normally paid by the merchants themselves who pass at least a portion of the fee through to consumers in pricing of goods and services. Thus, the third party payment processing increases costs to the consumers.

Another problem with presently available payment systems is the lack of security. Sensitive personal and financial information, such as names, card numbers, and passwords, are exposed every time a consumer makes a purchase. Thieves steal credit/debit card information from poorly secured corporate locations. Actual thefts and the risk of financial liability to consumers and merchants both increase the costs of web commerce and discourage consumers from purchasing online.

It would be desirable to have mobile device payment systems and methods that would overcome the above disadvantages.

SUMMARY OF THE INVENTION

The mobile device payment systems and methods described herein provide for making payments for both online and in-store purchases using just a mobile device, without the need for any third-party platform or network, fully supported by a mobile device manufacturer.

One aspect of the invention provides a method for a mobile device user to purchase goods/services from merchants with financing by a mobile device manufacturer including: providing a mobile device from the mobile device manufacturer to the mobile device user, the mobile device including a consumer account and a universal merchant account, the mobile device having a permanent identifier embedded in the mobile device; establishing a user account for the mobile device user with the mobile device manufacturer, the user account associating the mobile device user with the permanent identifier; establishing merchant accounts for the merchants with the mobile device manufacturer, the merchant accounts including a merchant identifier and merchant credit deposit information for each of the merchants; transforming the merchant accounts into a universal merchant account data set; providing the universal merchant account data set to the mobile device user; storing the universal merchant account data set in the universal merchant account of the mobile device; requesting the mobile device manufacturer to load consumer credit into the consumer account by providing a credit amount and the permanent identifier to the mobile device manufacturer; loading the credit amount into the consumer account of the mobile device associated with the permanent identifier; identifying goods/services for purchase from a selected one of the merchants by the mobile device user on the mobile device; determining a total price for the identified goods/services and a merchant identifier associated with the selected merchant on the mobile device; actuating a purchase button on the mobile device; retrieving merchant bank deposit instructions for the associated merchant identifier from the universal vendor account in response to the actuating the purchase button; retrieving purchase credit in an amount of the total price from the consumer account in response to the actuating the purchase button; and routing the retrieved credit to the selected merchant in accordance with the retrieved merchant credit deposit instructions.

Another aspect of the invention provides a method for a mobile device user to purchase goods/services from a merchant with financing by a mobile device manufacturer including: providing a mobile device from the mobile device manufacturer to the mobile device user, the mobile device having a permanent identifier embedded in the mobile device; establishing a user account for the mobile device user at the mobile device manufacturer, the user account associating the mobile device user with the permanent identifier; establishing a merchant account for the merchant at the mobile device manufacturer, the merchant account including a merchant identifier for the merchant; determining a total price for goods/services for purchase from the merchant by the mobile device user; receiving a purchase voucher request from the mobile device at the mobile device manufacturer, the purchase voucher request including the permanent identifier and the total price; transmitting a purchase voucher from the mobile device manufacturer to the mobile device in response to the receiving a purchase voucher request, the purchase voucher including an authorized payment amount equal to the total price; presenting the purchase voucher to the merchant; receiving an electronic invoice from the merchant at the mobile device manufacturer, the electronic invoice including the purchase voucher and the merchant identifier; and transferring funds for the authorized payment amount from the mobile device manufacturer to the merchant in response to the receiving an electronic invoice from the merchant at the mobile device manufacturer.

Another aspect of the invention provides a method for a mobile device user to purchase goods/services from a merchant with financing by a mobile device manufacturer including: providing a mobile device from the mobile device manufacturer to the mobile device user, the mobile device having a permanent identifier embedded in the mobile device; establishing a user account for the mobile device user with the mobile device manufacturer, the user account associating the mobile device user with the permanent identifier and a shipping address; establishing a merchant account for the merchant with the mobile device manufacturer; identifying on the mobile device goods/services for purchase by the mobile device user; sending an electronic order for the identified goods/services from the mobile device to the merchant, the electronic order including the permanent identifier and goods/services details for the identified goods/services, and no additional information about the mobile device user; sending a shipping address request including the permanent identifier to the mobile device manufacturer; sending the shipping address from the mobile device manufacturer to the merchant in response to the sending a shipping address request; shipping the goods/services from the merchant to the mobile device user at the shipping address in response to the sending an electronic order; sending an electronic invoice from the merchant to the mobile device manufacturer in response to the shipping the goods/services; and transferring funds of the mobile device manufacturer to the merchant as an electronic merchant payment in response to the sending an electronic invoice.

Another aspect of the invention provides a method for a mobile device user to purchase goods/services from a merchant with financing by a mobile device manufacturer including: setting up a user account for the mobile device user with the mobile device manufacturer; setting up a user account for the merchant with the mobile device manufacturer; identifying goods/services desired by the mobile device user on a display of the mobile device; sending an electronic order for the identified goods/services to the merchant from the display of the mobile device; shipping the goods/services from the merchant to the mobile device user in response to the sending an electronic order; sending an electronic invoice from the merchant to the mobile device manufacturer in response to the shipping the goods/services; and sending electronic merchant payment from the mobile device manufacturer to the merchant in response to the sending an invoice.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION

Figure 1:
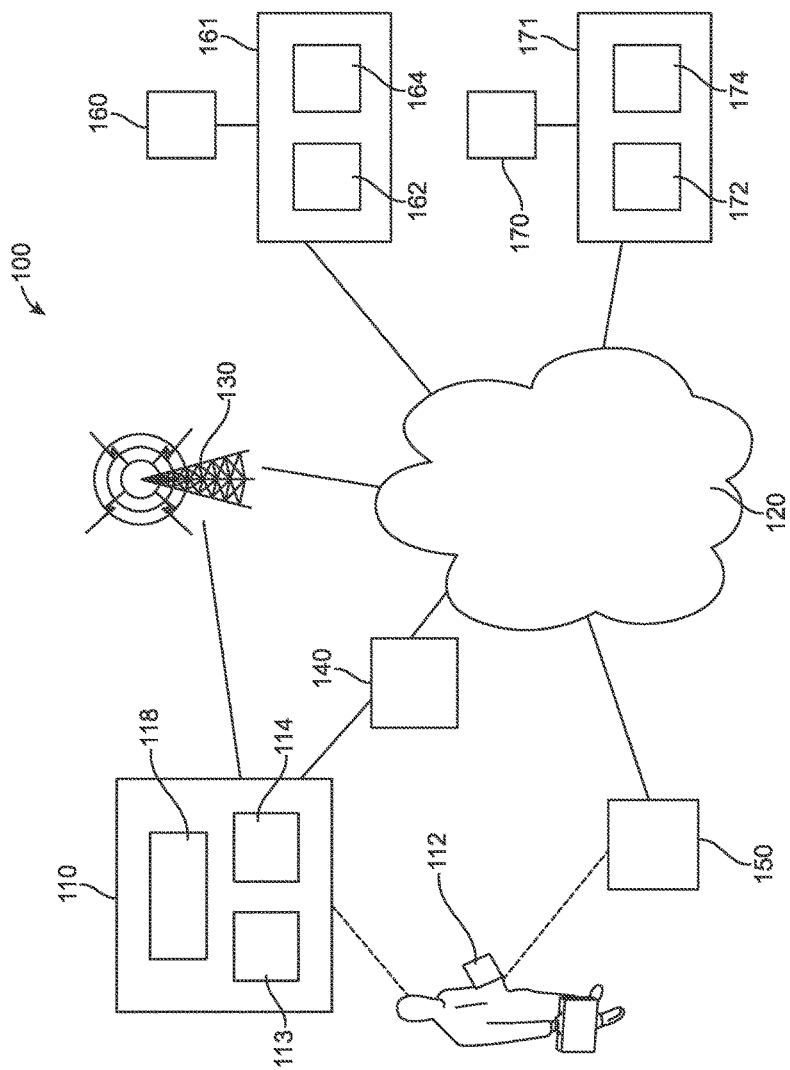
FIG. 1 is a schematic diagram of communication architecture for a mobile device payment system in accordance with the invention.

FIG. 1 is a schematic diagram of a mobile device payment system with communication architecture in accordance with the invention. The mobile device payment system allows a mobile device user to purchase goods/services from a merchant with financing by a mobile device manufacturer.

The mobile device payment system 100 includes a mobile device 110, a merchant server 171, and a mobile device manufacturer server 161. Each of the mobile device 110, merchant server 171, and mobile device manufacturer server 161 is operable to communicate with the others, i.e., the mobile device 110 is operable to communicate with the merchant server 171 and the mobile device manufacturer server 161, the merchant server 171 is operable to communicate with the mobile device 110 and the mobile device manufacturer server 161, and the mobile device manufacturer server 161 is operable to communicate with the mobile device 110 and the merchant server 171. The mobile device 110, merchant server 171, mobile device manufacturer server 161, and optional personal computer 150 include hardware and software as required to connect to the Internet 120.

The mobile device 110, which is defined herein as a smart phone, digital tablet, or any other portable wireless mobile device allowing a mobile device user 112 to communicate with the mobile device manufacturer server 161 and/or the merchant server 171, is operable to connect the user 112 to the Internet 120 through a cellular system 130 or a Wi-Fi node 140. The mobile device 110 can be obtained by the mobile device user 112 from a mobile device manufacturer 160. The mobile device manufacturer as defined herein can be any entity controlling the hardware and software implementation of the mobile device, such as a mobile device manufacturer, mobile device supplier, mobile device distributor, mobile phone network provider, or the like. The mobile device user 112 can optionally connect to the Internet 120 with a personal computer 150 that can optionally be used as part of establishing a user account for the mobile device user with the mobile device manufacturer, such as confirming details of the user account, confirming that the user account has been established, or the like. The mobile device 110 has a permanent identifier 118 embedded in the mobile device 110. The mobile device 110 also has a device processor 113 and device memory 114 operably connected to the device processor 114. The mobile device 110 can also include a graphic user interface (not shown) for input and output of information.

The merchant server 171 is operable to connect the merchant 170 to the Internet 120. The merchant server 171 has a merchant processor 172 and a merchant memory 174 operably connected to the merchant processor 172.

The mobile device manufacturer server 161 is operable to connect a mobile device manufacturer 160 to the Internet 120. The mobile device manufacturer server 161 has a supplier processor 162 and a supplier memory 164 operably connected to the supplier processor 162.

In the embodiment described in association with FIG. 2 below, the mobile device 110 can include storage for a universal merchant account data set and a consumer account. The universal merchant account data set is a compilation of the merchant accounts, which include a merchant identifier and merchant credit deposit information for each of the merchants. The consumer account includes credit for the mobile device user on the mobile device. In one embodiment, the universal merchant account data set and/or consumer account are stored in the device memory 114. In another embodiment, the universal merchant account data set and/or consumer account are stored in additional memory (not shown) independent of the device memory 114. In yet another embodiment, the universal merchant account data set and/or consumer account are stored in a solid-state chip (not shown), which is installed in the mobile device by the mobile device manufacturer or is installed in the mobile device by the mobile device user after the mobile device user receives the mobile device.

In embodiments described in association with FIGS. 3 & 6 below, the mobile device payment system 100 can include a merchant mobile device. As used herein, a merchant mobile device is defined as a smart phone, digital tablet, or any other portable wireless mobile device allowing the merchant 170 to communicate with the mobile device 110, the merchant server 161, and/or the mobile device manufacturer server 171.

Those skilled in the art will appreciate that the mobile device payment system 100 can be used to carry out mobile device payment methods such as those discussed in association with FIGS. 2-6 below. The memory of the particular device stores programming code executable by the processor of the particular device to carry out portions of the method performed by the particular device. Referring to FIG. 1, the memories (device memory 114, merchant memory 174, supplier memory 164) of the mobile device 110, merchant server 171, and mobile device manufacturer server 161 can store programming code executable by their respective processors (device processor 113, merchant processor 172, supplier processor 162) to carry out the mobile device payment methods.

The memories (device memory 114, merchant memory 174, supplier memory 164) of the mobile device 110, merchant server 171, and mobile device manufacturer server 161 can also store data. The merchant server 171 and mobile device manufacturer server 161 can be hardware and/or software servers, and can be single hardware devices or can be a number of distributed hardware devices as desired for a particular application. The mobile device 110, merchant server 171, and mobile device manufacturer server 161 can also include communication hardware/software as required to carry out the mobile device payment method.

The use of the mobile device payment system 100 to carry out mobile device payment methods such as those discussed in association with FIGS. 2-6 below can be illustrated by the use of the mobile device payment system 100 to carry out the mobile device payment method as discussed in association with FIG. 2. Those skilled in the art will appreciate that programming code for a step of the method initiated in one device can require complementary programming code for a step of the method completed in another device, e.g., the device memory 114 of the mobile device 110 can contain device programming code executable by the device processor 113 for establishing a user account for the mobile device user with the mobile device manufacturer and the supplier memory 164 of the mobile device manufacturer server 161 can contain complementary supplier programming code executable by the supplier processor 162 to carry out establishing a user account. In this example, the device processor 113 of the mobile device 110 stores a consumer account and a universal merchant account, and has a permanent identifier 118 embedded in the mobile device 110.

The device memory 114 of the mobile device 110 can contain device programming code executable by the device processor 113 for: establishing a user account for the mobile device user with the mobile device manufacturer, the user account associating the mobile device user with the permanent identifier; storing the universal merchant account data set in the universal merchant account of the mobile device; requesting the mobile device manufacturer to load consumer credit into the consumer account by providing a credit amount and the permanent identifier to the mobile device manufacturer; identifying goods/services for purchase from a selected one of the merchants by the mobile device user on the mobile device; determining a total price for the identified goods/services and a merchant identifier associated with the selected merchant on the mobile device; actuating a purchase button on the mobile device; retrieving merchant bank deposit instructions for the associated merchant identifier from the universal vendor account in response to the actuating the purchase button; retrieving purchase credit in an amount of the total price from the consumer account in response to the actuating the purchase button; and routing the retrieved credit to the selected merchant in accordance with the retrieved merchant credit deposit instructions.

The merchant memory 174 of the merchant server 171 can contain merchant programming code executable by the merchant processor 172 for establishing merchant accounts for the merchants with the mobile device manufacturer, the merchant accounts including a merchant identifier and merchant credit deposit information for each of the merchants.

The supplier memory 164 of the mobile device manufacturer server 161 can contain supplier programming code executable by the supplier processor 162 for: providing the universal merchant account data set to the mobile device user; and loading the credit amount into the consumer account of the mobile device associated with the permanent identifier.

Those skilled in the art will appreciate that the communication architecture for the mobile device payment system 100 is an example and that any number of other communication configurations can be used to carry out the method for a mobile device user to purchase goods/services from a merchant with financing by a mobile device manufacturer described above.

Figure 2:
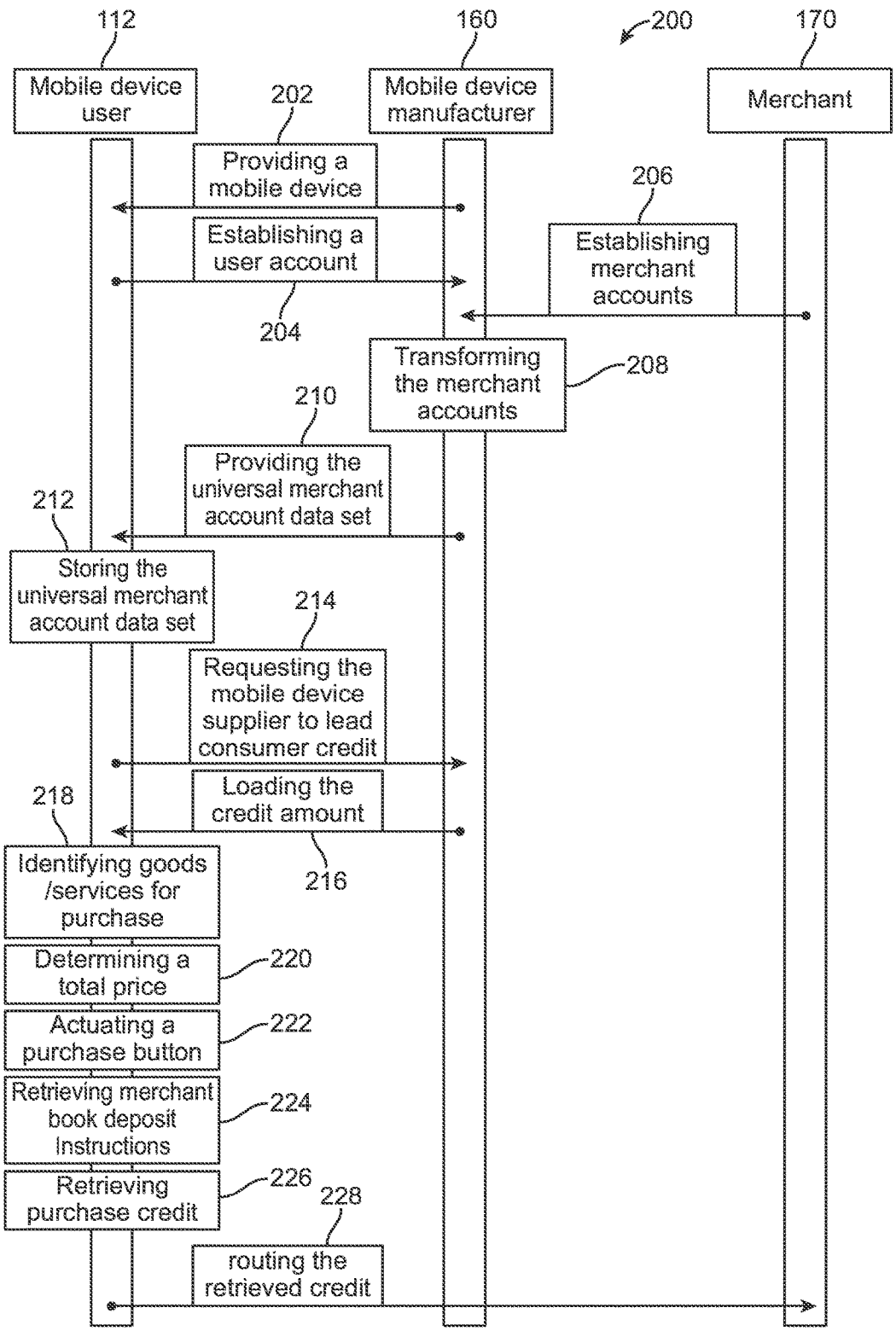
FIG. 2 is a block diagram of one embodiment of a mobile device payment method in accordance with the invention.

FIG. 2 is a block diagram of one embodiment of a mobile device payment method in accordance with the invention. In this embodiment, the mobile device user stores consumer credit and merchant account information on the mobile device, which then acts as a stand-alone credit/debit card. The method 200 can be performed on the mobile device payment system describe in association with FIG. 1 above.

Referring to FIG. 2, the method 200 for a mobile device user to purchase goods/services from merchants with financing by a mobile device manufacturer can include: providing a mobile device 202 from the mobile device manufacturer to the mobile device user, the mobile device including a consumer account and a universal merchant account, the mobile device having a permanent identifier embedded in the mobile device; establishing a user account 204 for the mobile device user with the mobile device manufacturer, the user account associating the mobile device user with the permanent identifier; establishing merchant accounts 206 for the merchants with the mobile device manufacturer, the merchant accounts including a merchant identifier and merchant credit deposit information for each of the merchants; transforming the merchant accounts 208 into a universal merchant account data set; providing the universal merchant account data set 210 to the mobile device user; storing the universal merchant account data set 212 in the universal merchant account of the mobile device; requesting the mobile device manufacturer to load consumer credit 214 into the consumer account by providing a credit amount and the permanent identifier to the mobile device manufacturer; loading the credit amount 216 into the consumer account of the mobile device associated with the permanent identifier; identifying goods/services for purchase 218 from a selected one of the merchants by the mobile device user on the mobile device; determining a total price 220 for the identified goods/services and a merchant identifier associated with the selected merchant on the mobile device; actuating a purchase button 222 on the mobile device; retrieving merchant bank deposit instructions 224 for the associated merchant identifier from the universal vendor account in response to the actuating the purchase button; retrieving purchase credit 226 in an amount of the total price from the consumer account in response to the actuating the purchase button; and routing the retrieved credit 228 to the selected merchant in accordance with the retrieved merchant credit deposit instructions. The permanent identifier is a unique identifier for the mobile device and the merchant identifier is a unique identifier for each merchant.

The method 200 can also account for shipping information. The user account can further associate the mobile device user with a shipping address. In one example, the method 200 also can include: sending an electronic order for the identified goods/services from the mobile device to the merchant in response to the actuating the purchase button, the electronic order including the permanent identifier and goods/services details for the identified goods/services, and no additional information about the mobile device user; sending a shipping address request including the permanent identifier from the mobile device to the mobile device manufacturer in response to the actuating the purchase button; and sending the shipping address from the mobile device manufacturer to the merchant in response to the sending a shipping address request. In another example, the method 200 also can include: sending an electronic order for the identified goods/services from the mobile device to the merchant in response to the actuating the purchase button, the electronic order including the permanent identifier and goods/services details for the identified goods/services, and no additional information about the mobile device user; receiving the electronic order at the merchant; sending a shipping address request including the permanent identifier from the merchant to the mobile device manufacturer in response to the receiving the electronic order button; and sending the shipping address from the mobile device manufacturer to the merchant in response to the sending a shipping address request. As used herein, "no additional information about the mobile device user" is defined as any information from which a third party could discern the identity of the mobile device user. In one embodiment, the mobile device can be selected from the group consisting of a smart phone and a digital tablet. In one embodiment, the mobile device manufacturer can be a mobile device manufacturer.

The method 200 can also clear transaction information from the mobile device after a purchase. In one example, the method 200 can also include clearing temporary storage registers on the mobile device in response to the routing of the retrieved credit 228 to the selected merchant.

The providing a mobile device 202; establishing a user account 204; establishing merchant accounts 206; transforming the merchant accounts 208 into a universal merchant account data set; providing the universal merchant account data set 210; and storing the universal merchant account data set 212 prepares the mobile device payment system for use by the mobile device user. The requesting the mobile device manufacturer to load consumer credit 214 and loading the credit amount 216 into the consumer account of the mobile device associated with the permanent identifier sets up the mobile device as a credit/debit card with money loaded on the mobile device, so that the mobile device user can make a purchase using the mobile device. The identifying goods/services for purchase 218; determining a total price 220; actuating a purchase button 222 on the mobile device; retrieving merchant bank deposit instructions 224; retrieving purchase credit 226; and routing the retrieved credit 228 allows the mobile device user to purchase particular goods/services and pay the merchant for the particular goods/services.

The preparation of the mobile device payment system for use can include various embodiments. In one embodiment, the establishing merchant accounts 206 for the merchants with the mobile device manufacturer can include randomly selecting an alphanumeric code as the merchant identifier. In one embodiment, the organizing the merchant accounts 208 can include encrypting the universal merchant account data set. In one embodiment, the providing the universal merchant account data set 210 to the mobile device user can include providing the universal merchant account data set to the mobile device user with the universal merchant account data set stored on a solid-state chip and the storing the universal merchant account data set 212 in the universal merchant account of the mobile device can include plugging the solid-state chip into the mobile device. In one embodiment, the transforming the merchant accounts 208 into a universal merchant account data set for the merchants with the mobile device manufacturer can include establishing merchant accounts for the merchants located within a specified geographic area. In another embodiment, the transforming the merchant accounts 208 into a universal merchant account data set for the merchants with the mobile device manufacturer can include prescreening and selection of the merchant accounts by the mobile device manufacturer.

The setting up of the mobile device as a credit/debit card can also include various embodiments. In one embodiment, the loading the credit amount 216 into the consumer account can include loading the credit amount into the consumer account from a user cash account maintained with the mobile device manufacturer. In another embodiment, the loading the credit amount 216 into the consumer account can include loading the credit amount into the consumer account from a user revolving credit account maintained with the mobile device manufacturer. In one embodiment, the loading the credit amount 216 into the consumer account establishes a credit balance on the mobile device, and the method 200 further can include reducing the credit balance in the consumer account by the amount of the total price in response to the retrieving credit. The method 200 can further include restoring the credit balance to an initial value by loading the amount of the total price into the consumer account from a user account maintained with the mobile device manufacturer, the user account being selected from the group consisting of a user cash account and a user revolving credit account.

The purchase of particular goods/services and payment of the merchant for the particular goods/services can also include various embodiments. In one embodiment, the identifying goods/services for purchase 218 from a selected one of the merchants by the mobile device user on the mobile device can include ringing up the identified goods/services for purchase on a cash register at a physical store of the selected merchant; and the determining a total price 220 for the identified goods/services and a merchant identifier associated with the selected merchant on the mobile device can include calculating the total price for the rung up identified goods/services; and transferring the calculated total price and the merchant identifier to the mobile device.

The transferring the calculated total price and the merchant identifier to the mobile device can include optically scanning the calculated total price and the merchant identifier with the mobile device. In one example, the calculated total price and the merchant identifier are embedded in a QR code for optical scanning. In another example, the calculated total price and the merchant identifier are displayed in alphanumeric characters on paper, a graphics display, or any other visual display, and the optically scanning further can include optical character recognition of the alphanumeric characters. In one example, the transferring the calculated total price and the merchant identifier to the mobile device can include wirelessly transferring the calculated total price and the merchant identifier to the mobile device.

In one embodiment, the actuating a purchase button 222 on the mobile device can include actuating a purchase button displayed on a webpage of the selected merchant.

Figure 3:
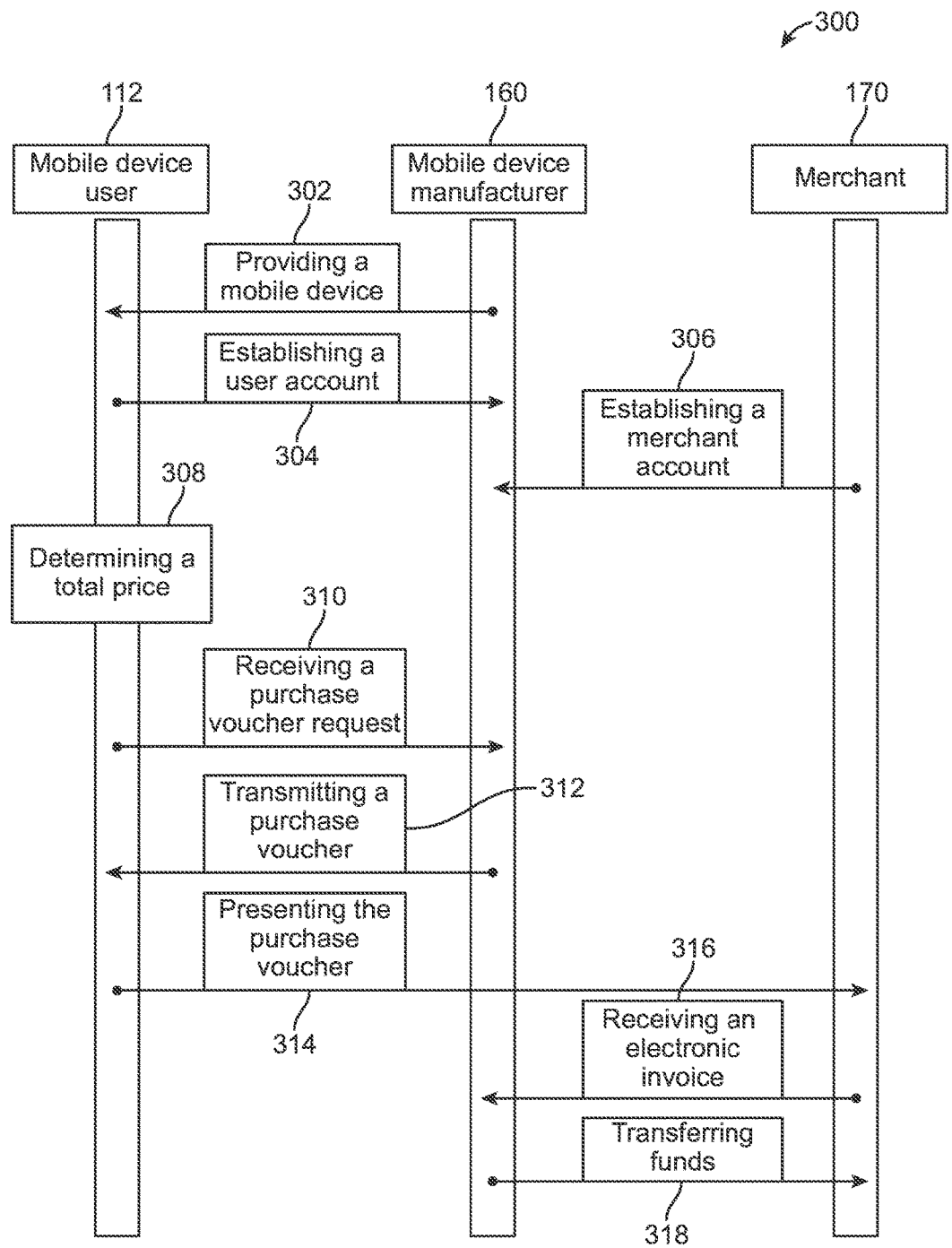
FIG. 3 is a block diagram of another embodiment of a mobile device payment method in accordance with the invention.

FIG. 3 is a block diagram of another embodiment of a mobile device payment method in accordance with the invention. In this embodiment, the mobile device user requests a purchase voucher from the mobile device manufacturer, which transmits the purchase voucher to the mobile device. The method 300 can be performed on the mobile device payment system describe in association with FIG. 1 above.

Referring to FIG. 3, the method 300 for a mobile device user to purchase goods/services from a merchant with financing by a mobile device manufacturer can include providing a mobile device 302 from the mobile device manufacturer to the mobile device user, the mobile device having a permanent identifier embedded in the mobile device; establishing a user account 304 for the mobile device user at the mobile device manufacturer, the user account associating the mobile device user with the permanent identifier; establishing a merchant account 306 for the merchant at the mobile device manufacturer, the merchant account including a merchant identifier for the merchant; determining a total price 308 for goods/services for purchase from the merchant by the mobile device user; receiving a purchase voucher request 310 from the mobile device at the mobile device manufacturer, the purchase voucher request including the permanent identifier and the total price; transmitting a purchase voucher 312 from the mobile device manufacturer to the mobile device in response to the receiving a purchase voucher request, the purchase voucher including an authorized payment amount equal to the total price; presenting the purchase voucher 314 to the merchant; receiving an electronic invoice 316 from the merchant at the mobile device manufacturer, the electronic invoice including the purchase voucher and the merchant identifier; and transferring funds 318 for the authorized payment amount from the mobile device manufacturer to the merchant in response to the receiving an electronic invoice from the merchant at the mobile device manufacturer. The permanent identifier is a unique identifier for the mobile device and the merchant identifier is a unique identifier for each merchant.

The providing a mobile device 302; establishing a user account 304; and establishing a merchant account 306 prepares the mobile device payment system for use by the mobile device user. The determining a total price 308 allows the mobile device user to initiate purchase of particular goods/services. The receiving a purchase voucher request 310; transmitting a purchase voucher 312; and presenting the purchase voucher 314 provides the mobile device user with a purchase voucher from the mobile device manufacturer to be used in purchasing the particular goods/services. The receiving an electronic invoice 316 and transferring funds 318 allows the mobile device manufacturer to pay the merchant for the particular goods/services.

The purchasing of the particular goods/services can include various embodiments. In one embodiment, the presenting the purchase voucher 314 to the merchant can also include determining the merchant identifier for the merchant on the mobile device; and presenting the merchant identifier to the merchant with the purchase voucher. In one example, the mobile device includes a merchant identifier table of merchant identifiers associated with a plurality of merchants, and the determining the merchant identifier can also include displaying a merchant list of the plurality of merchants on the mobile device; selecting one of the plurality of merchants from the merchant list; and looking up the merchant identifier for the selected one of the plurality of merchants from the merchant identifier table. In another example, the mobile device includes a merchant identifier table of merchant identifiers associated with a plurality of merchant GPS coordinates, and the determining the merchant identifier can also include determining a current GPS location for the mobile device; matching the current GPS location with one of the plurality of merchant GPS coordinates in the merchant identifier table; and looking up the merchant identifier for the matched one of the plurality of merchant GPS coordinates from the merchant identifier table.

In one embodiment, the presenting the purchase voucher 314 to the merchant can include presenting the purchase voucher to the merchant through a merchant mobile device. As used herein, a merchant mobile device is defined as a smart phone, digital tablet, or any other portable wireless mobile device allowing the merchant 170 to communicate with the mobile device, the merchant server, and/or the mobile device manufacturer server. The merchant mobile device allows the merchant 170 to receive the purchase voucher from the mobile device user 112 and/or to forward the purchase voucher to the mobile device manufacturer 160 in an electronic invoice.

Figure 4:
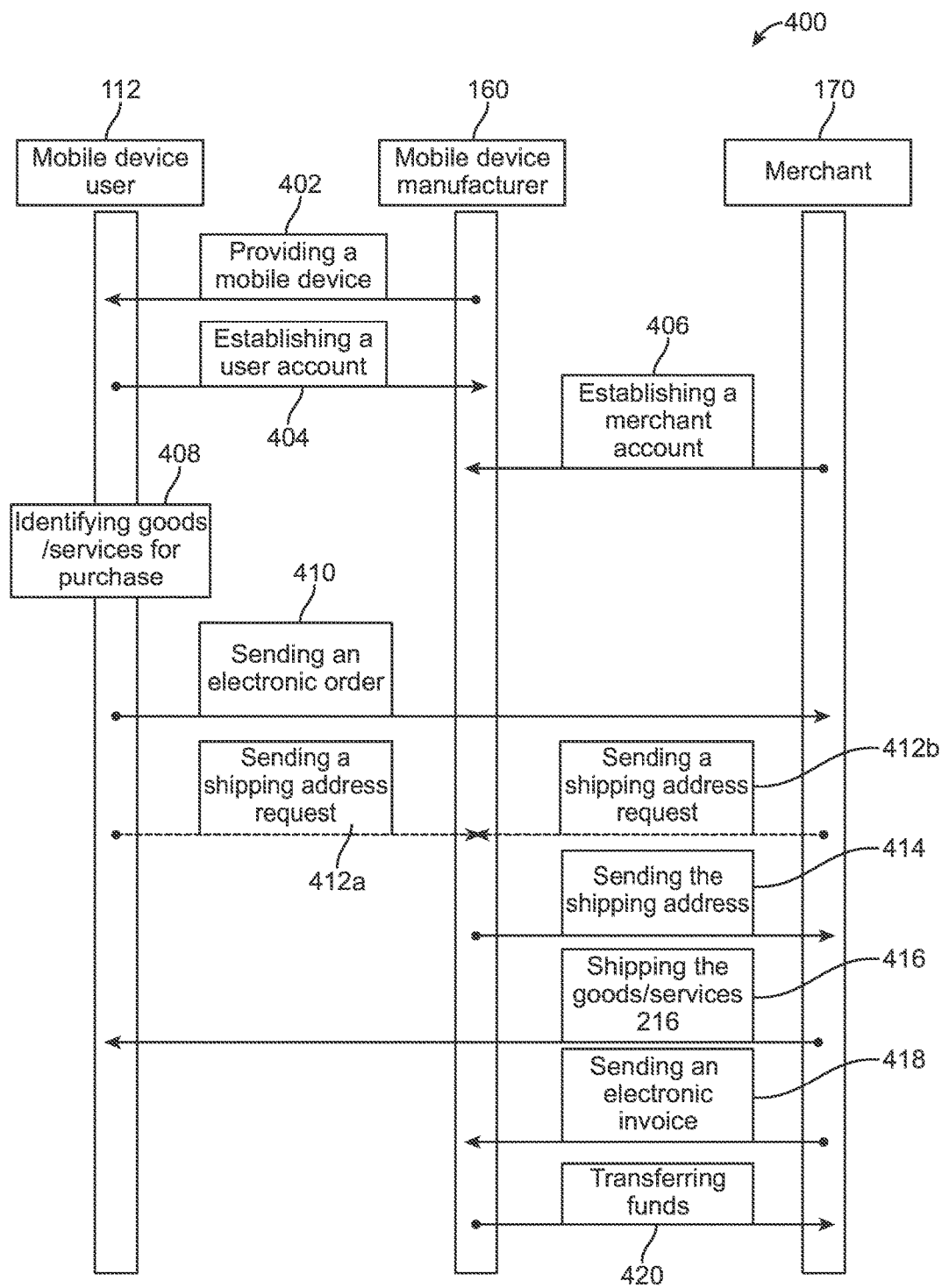
FIG. 4 is a block diagram of another embodiment of a mobile device payment method in accordance with the invention.

FIG. 4 is a block diagram of another embodiment of a mobile device payment method in accordance with the invention. In this embodiment, the method 400 provides for specifying a shipping address and shipping the goods/services. The method 400 can be performed on the mobile device payment system describe in association with FIG. 1 above.

Referring to FIG. 4, the method 400 for a mobile device user to purchase goods/services from a merchant with financing by a mobile device manufacturer can include: providing a mobile device 402 from the mobile device manufacturer to the mobile device user, the mobile device having a permanent identifier embedded in the mobile device; establishing a user account 404 for the mobile device user with the mobile device manufacturer, the user account associating the mobile device user with the permanent identifier and a shipping address; establishing a merchant account 406 for the merchant with the mobile device manufacturer; identifying on the mobile device goods/services for purchase 408 by the mobile device user; sending an electronic order 410 for the identified goods/services from the mobile device to the merchant, the electronic order including the permanent identifier and goods/services details for the identified goods/services, and no additional information about the mobile device user; sending a shipping address request 412 including the permanent identifier to the mobile device manufacturer; sending the shipping address 414 from the mobile device manufacturer to the merchant in response to the sending a shipping address request; shipping the goods/services 416 from the merchant to the mobile device user at the shipping address in response to the sending an electronic order; sending an electronic invoice 418 from the merchant to the mobile device manufacturer in response to the shipping the goods/services; and transferring funds 420 of the mobile device manufacturer to the merchant as an electronic merchant payment in response to the sending an electronic invoice. The permanent identifier is a unique identifier for the mobile device and the merchant identifier is a unique identifier for each merchant.

The providing a mobile device 402; establishing a user account 404; and establishing a merchant account 406 prepares the mobile device payment system for use by the mobile device user. The identifying on the mobile device goods/services for purchase 408 and sending an electronic order 410 allows the mobile device user to initiate purchase of particular goods/services. The sending a shipping address request 412; sending the shipping address 414; and shipping the goods/services 416 determines a shipping address for and ships the goods/services to the mobile device user. The sending an electronic invoice 418 and transferring funds 420 allows the mobile device manufacturer to pay the merchant for the particular goods/services.

The sending a shipping address request 412 can include various embodiments. In one embodiment, the sending a shipping address request 412 including the permanent identifier to the mobile device manufacturer can include sending the shipping address request including the permanent identifier from the merchant to the mobile device manufacturer 412b in response to the sending an electronic order. In one embodiment, the sending a shipping address request 412 including the permanent identifier to the mobile device manufacturer can include sending the electronic order including the permanent identifier from the mobile device to the mobile device manufacturer 412a.

Figure 5:
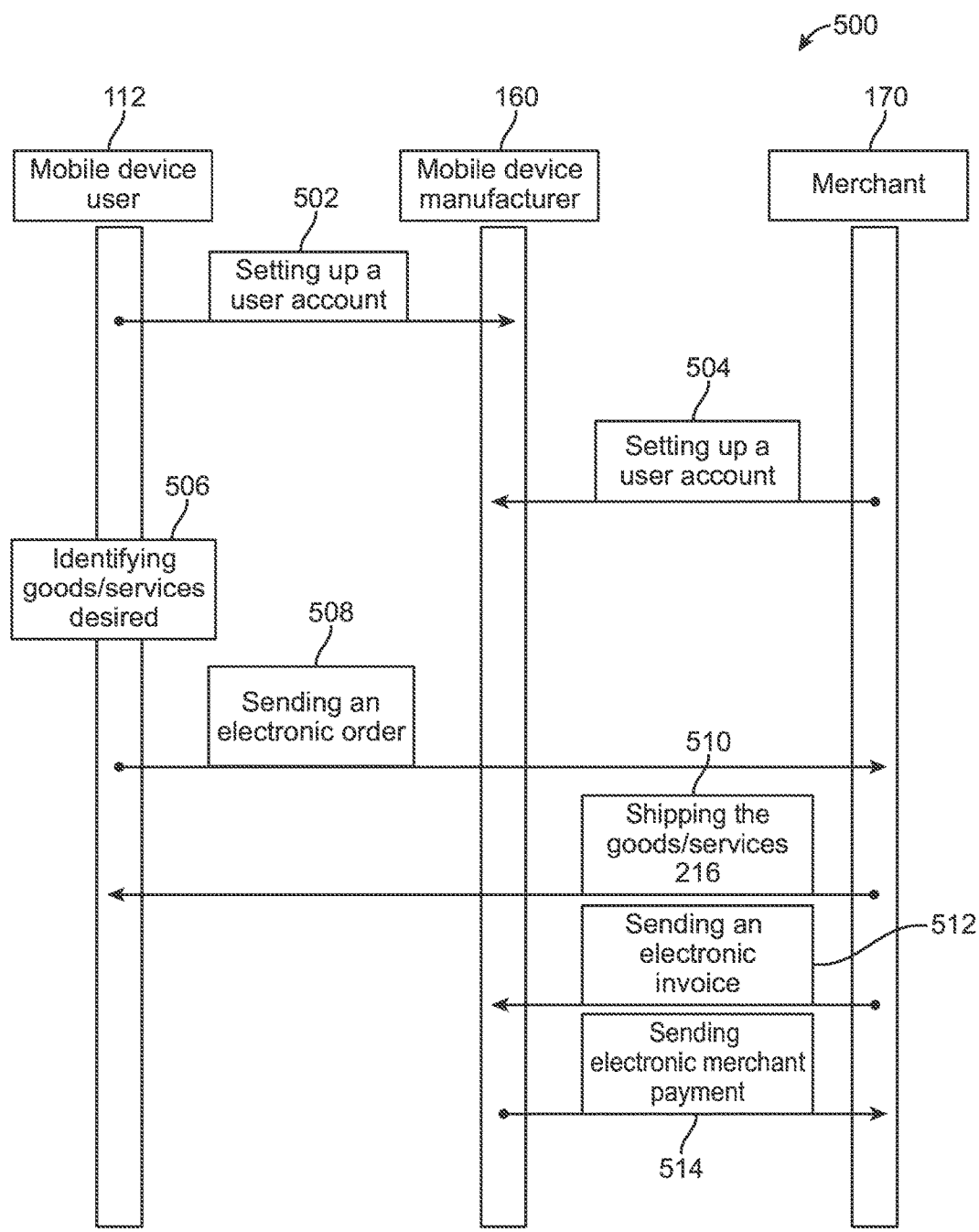
FIG. 5 is a block diagram of another embodiment of a mobile device payment method in accordance with the invention.

FIG. 5 is a block diagram of another embodiment of a mobile device payment method in accordance with the invention. In this embodiment, the method 500 provides for shipping the goods/services. The method 500 can be performed on the mobile device payment system describe in association with FIG. 1 above.

Referring to FIG. 5, the method 500 for a mobile device user to purchase goods/services from a merchant with financing by a mobile device manufacturer can include: setting up a user account for the mobile device user 502 with the mobile device manufacturer; setting up a user account for the merchant 504 with the mobile device manufacturer; identifying goods/services desired 506 by the mobile device user on a display of the mobile device; sending an electronic order 508 for the identified goods/services to the merchant from the display of the mobile device; shipping the goods/services 510 from the merchant to the mobile device user in response to the sending an electronic order; sending an electronic invoice 512 from the merchant to the mobile device manufacturer in response to the shipping the goods/services; and sending electronic merchant payment 514 from the mobile device manufacturer to the merchant in response to the sending an invoice. The mobile device can be a smart phone, a digital tablet, or the like. Exemplary mobile device manufacturers include Apple, Google, Microsoft, Samsung, Lenovo and the like.

The setting up a user account for the mobile device user 502 and setting up a user account for the merchant 504 prepares the mobile device payment system for use by the mobile device user. The identifying goods/services desired 506; sending an electronic order 508; and shipping the goods/services 510 allows the mobile device user to initiate purchase of and receive particular goods/services. The sending an electronic invoice 512 and sending electronic merchant payment 514 allows the mobile device manufacturer to pay the merchant for the particular goods/services.

The method 500 can also provide for payment of the mobile device manufacturer by the mobile device user. In one embodiment, the method 500 can further include sending an electronic bill from the mobile device manufacturer to the mobile device user; and sending user payment from the mobile device user to the mobile device manufacturer in response to the sending an electronic invoice. In another embodiment, the method 500 can further include setting up a revolving line of credit for the mobile device user with the mobile device manufacturer; sending an electronic bill from the mobile device manufacturer to the mobile device user; and periodically sending partial user payment from the mobile device user to the mobile device manufacturer in response to the sending an electronic bill.

The payment of the merchant for the particular goods/services can include various embodiments. The method 500 can also provide for problems with the user account of the mobile device user, e.g., when the mobile device user status is not acceptable due to credit problems, a lost mobile device which is reported stolen, or the like. In one embodiment, the method 500 can further include sending an electronic mobile device user identification request from the merchant to the mobile device manufacturer in response to the sending an electronic order 508; sending a mobile device user status from the mobile device manufacturer to the merchant in response to the sending an electronic mobile device user identification request; and the shipping the goods/services 510 can include canceling the shipping the goods/services when the mobile device user status is not acceptable. In another embodiment, the method 500 can further include sending an electronic mobile device user identification request from the merchant to the mobile device manufacturer in response to the sending an electronic order 508; sending a mobile device user status from the mobile device manufacturer to the merchant in response to the sending an electronic mobile device user identification request; and shutting down the mobile device when the mobile device user status is not acceptable.

In one embodiment, the sending of an electronic order 508 can include sending an electronic order for the identified goods/services to the merchant from the display of the mobile device by the mobile device user clicking on a single button on the display of the mobile device.

The initiation of the purchase of particular goods/services can include various embodiments. The method 500 can also include a mobile device user identifier linked to the particular mobile device and mobile device user. In one embodiment, the electronic order includes the mobile device user identifier, which can be constant for all electronic orders from the mobile device or can be a unique identifier generated by the mobile device for the particular electronic order. In another embodiment, the identifying goods/services desired 506 includes providing a mobile device user identifier to the merchant, such as providing the mobile device user identifier to the merchant when the link is established to the website of the merchant. In one example, the electronic order does not include the mobile device user identifier, which has already been provided when establishing the link from the mobile device to the merchant website.

The mobile device manufacturer is responsible for financing the goods/services transaction between the mobile device user and the merchant, so no credit card company is involved in the transaction. The method 500 can include the mobile device manufacturer being solely responsible for in-house bank functions for the user account. Exemplary in-house bank functions include transaction capture, transaction processing, bank conductivity, bank statement processing, reconciliation, bank statement distribution, and the like.

Figure 6:
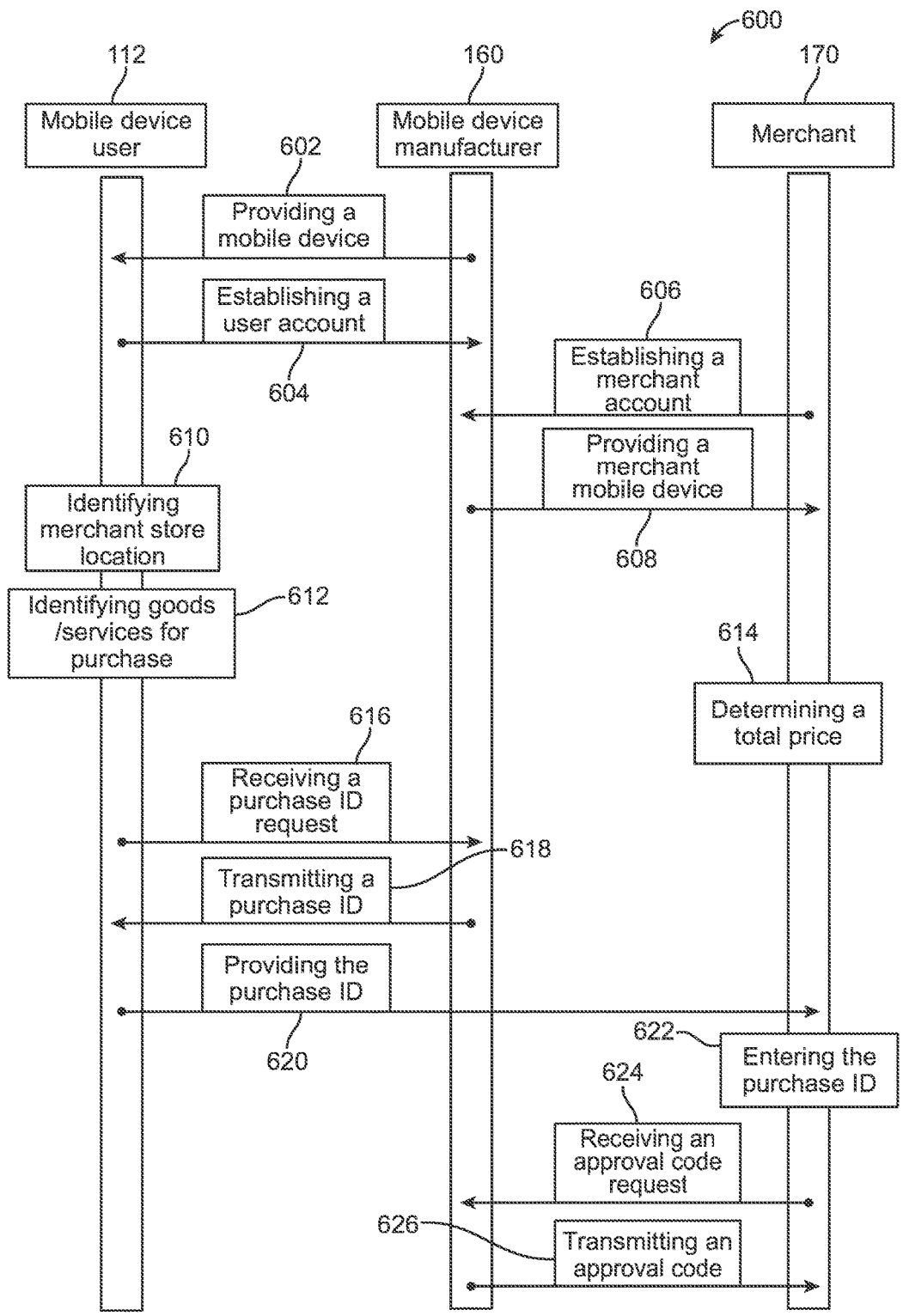
FIG. 6 is a block diagram of another embodiment of a mobile device payment method in accordance with the invention.

FIG. 6 is a block diagram of another embodiment of a mobile device payment method in accordance with the invention. In this embodiment, the method for a mobile device user to purchase goods/services from a merchant while in-store using their mobile device in the same way as a credit or debit card is typically used. The process can be executed as follows: (a) the merchant will register in advance for payment acceptance with the mobile device manufacturer, just as they would with a card provider, and receive their own merchant mobile device from the mobile device manufacturer, (b) when present in a store, after selecting products for purchase, the mobile device consumer user will identify the particular store manually or automatically, e.g., via GPS or other location service, when possible, (c) the merchant will use their existing point-of-sale equipment to record the sale, as usual, (d) the mobile device user will request a unique purchase ID from the manufacturer and provide it to the merchant, (e) the merchant will enter this purchase ID into their mobile device, (f) the mobile device manufacturer will respond to the merchant with an approval code, the same as the merchant would receive for a card purchase, thus completing the sale. The method 600 can be performed on the mobile device payment system describe in association with FIG. 1 above.

Referring to FIG. 6, the method 600 for a mobile device user to purchase goods/services from a merchant with financing by a mobile device manufacturer can include providing a mobile device 602 from the mobile device manufacturer to the mobile device user, the mobile device having a permanent identifier embedded in the mobile device; establishing a user account 604 for the mobile device user at the mobile device manufacturer, the user account associating the mobile device user with the permanent identifier; establishing a merchant account 606 for the merchant at the mobile device manufacturer, the merchant account including a merchant identifier for the merchant; and providing a merchant mobile device 608 from the mobile device manufacturer to the mobile device user, the mobile device having a merchant permanent identifier embedded in the merchant mobile device. As used herein, the merchant mobile device is defined as a smart phone, digital tablet, or any other portable wireless mobile device allowing the merchant 170 to communicate with the mobile device, the merchant server, and/or the mobile device manufacturer server. The permanent identifier, merchant identifier, and merchant permanent identifier are unique identifiers for the mobile device, merchant, and merchant mobile device, respectively.

The method 600 can continue with the mobile device user optionally identifying a merchant store location 610. In one embodiment, the mobile device identifies the merchant store location automatically using a GPS location device within the mobile device. In another embodiment, the mobile device user identifies the merchant store location by manually inputting the store name, address, zip code, or the like. In yet another embodiment, the identifying a merchant store location 610 is omitted from the method 600.

The method 600 can continue with identifying goods/services for purchase 612 and determining a total price 614 for the identified goods/services. In one embodiment, the identifying goods/services for purchase 612 includes the mobile device user selecting physical goods off the shelves at the merchant store location. In another embodiment, the identifying goods/services for purchase 612 includes the mobile device user selecting goods virtually on the mobile device. In one embodiment, the determining a total price 614 includes ringing up the identified goods/services at a cash register of the merchant.

The method 600 can continue with the mobile device manufacturer receiving a purchase ID request 616 from the mobile device user, the purchase ID request including the permanent identifier, and the mobile device manufacturer transmitting a purchase ID 618 to the mobile device user in response to the receiving a purchase ID request. In one embodiment, the purchase ID request optionally includes the merchant store location.

The method 600 can continue with the mobile device user providing the purchase ID 620 to the merchant and the merchant entering the purchase ID 622 in the merchant mobile device. The method 600 can conclude with the mobile device manufacturer receiving an approval code request 624 from the merchant, the approval code request including the purchase ID, and the mobile device manufacturer transmitting an approval code 626 to the merchant in response to the receiving an approval code request.

Those skilled in the art will appreciate that the elements of the methods described in association with FIGS. 2-6 can be stored as computer readable code on a non-transitory computer readable medium as desired for a particular application. The storage of computer readable code on a non-transitory computer readable medium for mobile device payment methods such as those discussed in association with FIGS. 2-6 can be illustrated by the storage of computer readable code on a non-transitory computer readable medium for the mobile device payment method as discussed in association with FIG. 2.

The storage of computer readable code of the elements of the method described in FIG. 2 can be illustrated as a non-transitory computer readable medium including computer readable code for a mobile device user to purchase goods/services from merchants with financing by a mobile device manufacturer providing a mobile device from the mobile device manufacturer to the mobile device user, the mobile device including a consumer account and a universal merchant account, the mobile device having a permanent identifier embedded in the mobile device, the medium comprising: computer readable code for establishing a user account for the mobile device user with the mobile device manufacturer, the user account associating the mobile device user with the permanent identifier; computer readable code for establishing merchant accounts for the merchants with the mobile device manufacturer, the merchant accounts including a merchant identifier and merchant credit deposit information for each of the merchants; computer readable code for transforming the merchant accounts into a universal merchant account data set; computer readable code for providing the universal merchant account data set to the mobile device user; computer readable code for storing the universal merchant account data set in the universal merchant account of the mobile device; computer readable code for requesting the mobile device manufacturer to load consumer credit into the consumer account by providing a credit amount and the permanent identifier to the mobile device manufacturer; computer readable code for loading the credit amount into the consumer account of the mobile device associated with the permanent identifier; computer readable code for identifying goods/services for purchase from a selected one of the merchants by the mobile device user on the mobile device; computer readable code for determining a total price for the identified goods/services and a merchant identifier associated with the selected merchant on the mobile device; computer readable code for receiving actuation of a purchase button on the mobile device; computer readable code for retrieving merchant bank deposit instructions for the associated merchant identifier from the universal vendor account in response to the actuation of the purchase button; computer readable code for retrieving purchase credit in an amount of the total price from the consumer account in response to the actuation of the purchase button; and computer readable code for routing the retrieved credit to the selected merchant in accordance with the retrieved merchant credit deposit instructions.

As defined herein, "non-transitory computer readable medium" comprises all computer readable medium, with the sole exception being a transitory, propagating signal. The non-transitory computer readable medium can include volatile and/or non-volatile memory. Volatile memory can include memory that depends upon power to store information, e.g., various types of dynamic random access memory (DRAM), and the like. Non-volatile memory can include memory that does not depend upon power to store information, e.g., solid state media such as flash memory, EEPROM, phase change random access memory (PCRAM), and the like. Other exemplary non-transitory computer readable medium include optical discs such as digital video discs (DVD), high definition digital versatile discs (HD DVD), compact discs (CD), and laser discs; magnetic media such as magnetic tapes, tape drives, floppy discs, and magnetic hard drives; solid state media such as flash memory, memory cards, solid-state drives, USB flash drives, random access memory (RAM), static random access memory (SRAM), dynamic random access memory (DRAM), magnetic random access memory (MRAM), phase change random access memory (PCRAM), read-only memory (ROM), programmable read-only memory (PROM), erasable programmable read-only memory (EPROM), electrically erasable programmable read-only memory (EEPROM); and other types of media from which a computer, a processor or other electronic device can read.

Those skilled in the art will further appreciate that the elements of the methods described in association with FIGS. 2-6 can be expressed as signals between components of the mobile device payment system when information is transferred between the components as desired for a particular application. The signals for mobile device payment methods such as those discussed in association with FIGS. 2-6 can be illustrated by signals for the mobile device payment method as discussed in association with FIG. 2.

The signals of the method described in FIG. 2 can be illustrated as a system for a mobile device user to purchase goods/services from merchants with financing by a mobile device manufacturer, the system comprising: a mobile device including a consumer account and a universal merchant account, the mobile device having a permanent identifier embedded in the mobile device; a mobile device manufacturer server operably connected to the mobile device and merchant servers; the merchant servers operably connected to the mobile device and the mobile device manufacturer server; wherein the mobile device is operable to send a user account request signal to the mobile device manufacturer server to establish a user account for the mobile device user with the mobile device manufacturer, the user account associating the mobile device user with the permanent identifier; wherein the merchant servers are operable to send merchant account request signals to the mobile device manufacturer server to establish merchant accounts for the merchants with the mobile device manufacturer, the merchant accounts including a merchant identifier and merchant credit deposit information for each of the merchants; wherein the mobile device manufacturer server is operable to transform the merchant accounts into a universal merchant account data set; wherein the mobile device manufacturer server is operable to send a data set signal to the mobile device to provide the universal merchant account data set to the mobile device user; wherein the mobile device is operable to store the universal merchant account data set in the universal merchant account of the mobile device; wherein the mobile device is operable to send a consumer credit request signal to the mobile device manufacturer server to request the mobile device manufacturer to load consumer credit into the consumer account by providing a credit amount and the permanent identifier to the mobile device manufacturer; wherein the merchant servers are operable to send credit amount signals to the mobile device to load the credit amount into the consumer account of the mobile device associated with the permanent identifier; wherein the mobile device is operable to identify goods/services for purchase from a selected one of the merchants by the mobile device user on the mobile device, determine a total price for the identified goods/services and a merchant identifier associated with the selected merchant on the mobile device, respond to actuating a purchase button on the mobile device, retrieve merchant bank deposit instructions for the associated merchant identifier from the universal vendor account in response to the actuating the purchase button, and retrieve purchase credit in an amount of the total price from the consumer account in response to the actuating the purchase button; and wherein the mobile device is operable to send a retrieved credit signal to the merchant servers to route the retrieved credit to the selected merchant in accordance with the retrieved merchant credit deposit instructions.

It is important to note that FIGS. 1-6 illustrate specific applications and embodiments of the invention, and are not intended to limit the scope of the present disclosure or claims to that which is presented therein. For example, other entities, such as a mobile device supplier, mobile device distributor, or the like, can take the place of the mobile device manufacturer. Upon reading the specification and reviewing the drawings hereof, it will become immediately obvious to those skilled in the art that myriad other embodiments of the invention are possible, and that such embodiments are contemplated and fall within the scope of the presently claimed invention. The elements of the methods described in association with FIGS. 2-6 can be combined as desired for a particular application.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for a mobile device user to purchase goods/services from merchants with financing by a mobile device manufacturer, the method comprising:
    providing a mobile device from the mobile device manufacturer to the mobile device user, the mobile device including a consumer account and a universal merchant account, the mobile device having a permanent identifier embedded in the mobile device;
    establishing a user account for the mobile device user with the mobile device manufacturer, the user account associating the mobile device user with the permanent identifier;
    establishing merchant accounts for the merchants with the mobile device manufacturer, the merchant accounts including a merchant identifier and merchant credit deposit information for each of the merchants;
    transforming the merchant accounts into a universal merchant account data set;
    providing the universal merchant account data set to the mobile device user;
    storing the universal merchant account data set in the universal merchant account of the mobile device;
    requesting the mobile device manufacturer to load consumer credit into the consumer account by providing a credit amount and the permanent identifier to the mobile device manufacturer;
    loading the credit amount into the consumer account of the mobile device associated with the permanent identifier;
    identifying goods/services for purchase from a selected one of the merchants by the mobile device user on the mobile device;
    determining a total price for the identified goods/services and a merchant identifier associated with the selected merchant on the mobile device;
    actuating a purchase button on the mobile device;
    retrieving merchant bank deposit instructions for the associated merchant identifier from the universal vendor account in response to the actuating the purchase button;
    retrieving purchase credit in an amount of the total price from the consumer account in response to the actuating the purchase button; and
    routing the retrieved credit to the selected merchant in accordance with the retrieved merchant credit deposit instructions.

2. The method of claim 1 wherein the user account further associates the mobile device user with a shipping address, the method further comprising:
    sending an electronic order for the identified goods/services from the mobile device to the merchant in response to the actuating the purchase button, the electronic order including the permanent identifier and goods/services details for the identified goods/services, and no additional information about the mobile device user;
    sending a shipping address request including the permanent identifier from the mobile device to the mobile device manufacturer in response to the actuating the purchase button; and
    sending the shipping address from the mobile device manufacturer to the merchant in response to the sending a shipping address request.

3. The method of claim 1 wherein the user account further associates the mobile device user with a shipping address, the method further comprising:
    sending an electronic order for the identified goods/services from the mobile device to the merchant in response to the actuating the purchase button, the electronic order including the permanent identifier and goods/services details for the identified goods/services, and no additional information about the mobile device user;
    receiving the electronic order at the merchant;
    sending a shipping address request including the permanent identifier from the merchant to the mobile device manufacturer in response to the receiving the electronic order button; and
    sending the shipping address from the mobile device manufacturer to the merchant in response to the sending a shipping address request.

4. The method of claim 1 wherein the actuating a purchase button on the mobile device comprises actuating a purchase button displayed on a webpage of the selected merchant.

5. The method of claim 1 wherein:
    the identifying goods/services for purchase from a selected one of the merchants by the mobile device user on the mobile device comprises ringing up the identified goods/services for purchase on a cash register at a physical store of the selected merchant; and
    the determining a total price for the identified goods/services and a merchant identifier associated with the selected merchant comprises:
    calculating the total price for the rung up identified goods/services; and
    transferring the calculated total price and the merchant identifier to the mobile device.

6. The method of claim 5 wherein the transferring the calculated total price and the merchant identifier to the mobile device comprises optically scanning the calculated total price and the merchant identifier with the mobile device.

7. The method of claim 6 wherein the calculated total price and the merchant identifier are embedded in a QR code.

8. The method of claim 6 wherein the calculated total price and the merchant identifier are displayed in alphanumeric characters and the optically scanning further comprises optical character recognition of the alphanumeric characters.

9. The method of claim 5 wherein the transferring the calculated total price and the merchant identifier to the mobile device comprises wirelessly transferring the calculated total price and the merchant identifier to the mobile device.

10. The method of claim 1 wherein the mobile device manufacturer is a mobile device manufacturer.

11. The method of claim 1 wherein the establishing merchant accounts for the merchants with the mobile device manufacturer further comprises randomly selecting an alphanumeric code as the merchant identifier.

12. The method of claim 1 wherein the organizing the merchant accounts further comprises encrypting the universal merchant account data set.

13. The method of claim 1 wherein:
the providing the universal merchant account data set to the mobile device user further comprises providing the universal merchant account data set to the mobile device user with the universal merchant account data set stored on a solid-state chip; and
the storing the universal merchant account data set in the universal merchant account of the mobile device further comprises plugging the solid-state chip into the mobile device.

14. The method of claim 1 wherein the transforming the merchant accounts into a universal merchant account data set further comprises selecting the merchant accounts for the merchants located within a specified geographic area.

15. The method of claim 1 wherein the transforming the merchant accounts into a universal merchant account data set further comprises prescreening and selection of the merchant accounts by the mobile device manufacturer.

16. The method of claim 1 wherein the loading the credit amount into the consumer account comprises loading the credit amount into the consumer account from a user cash account maintained with the mobile device manufacturer.

17. The method of claim 1 wherein the loading the credit amount into the consumer account comprises loading the credit amount into the consumer account from a user revolving credit account maintained with the mobile device manufacturer.

18. The method of claim 1 wherein the loading the credit amount into the consumer account establishes a credit balance on the mobile device, the method further comprising reducing the credit balance in the consumer account by the amount of the total price in response to the retrieving credit.

19. The method of claim 18 further comprising restoring the credit balance to an initial value by loading the amount of the total price into the consumer account from a user account maintained with the mobile device manufacturer, the user account being selected from the group consisting of a user cash account and a user revolving credit account.

20. The method of claim 1 further comprising clearing temporary storage registers on the mobile device in response to the routing of the retrieved credit to the selected merchant.

* * * * *